No. 784,313.　　　　　　　　　　　　　　Patented March 7, 1905.

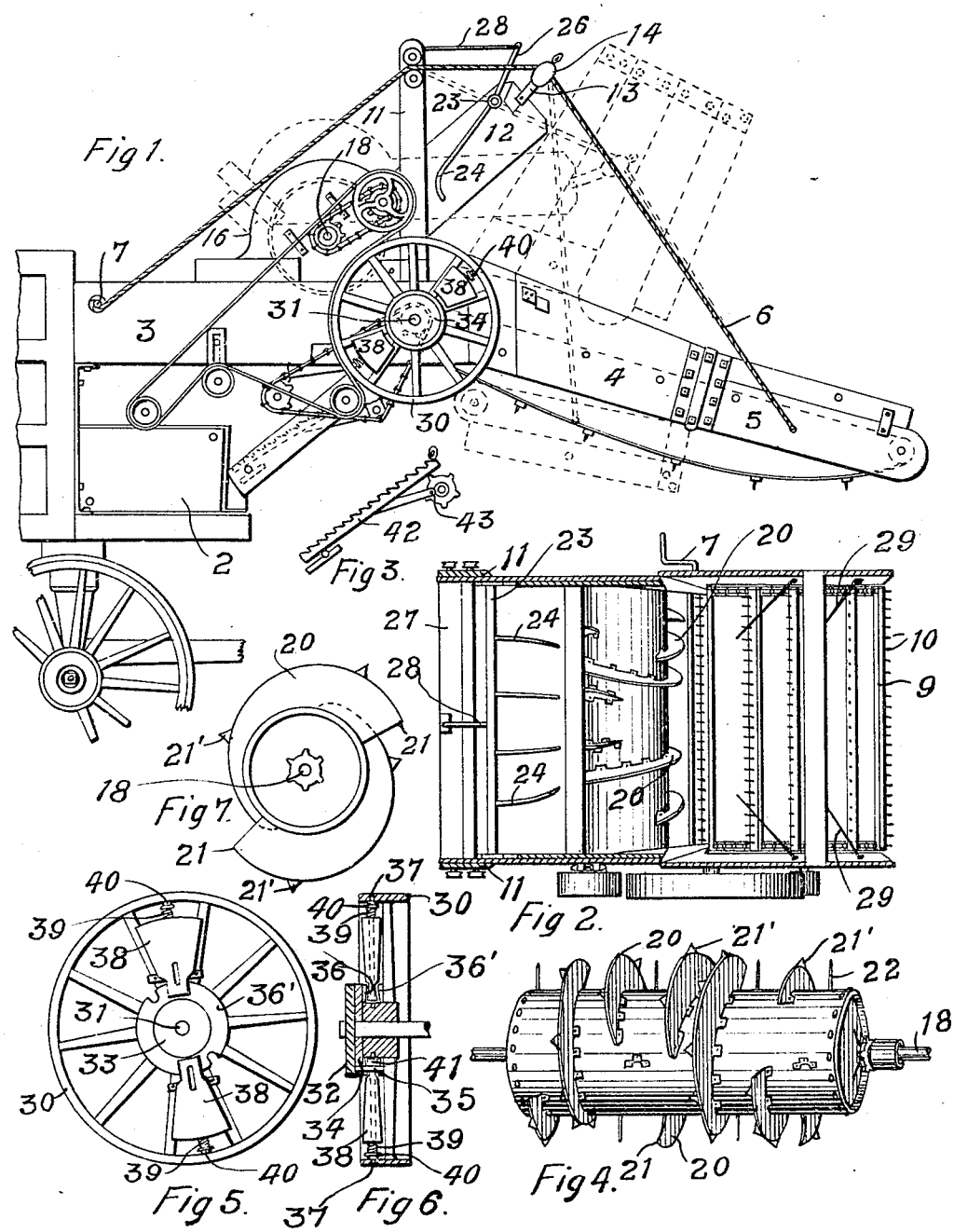

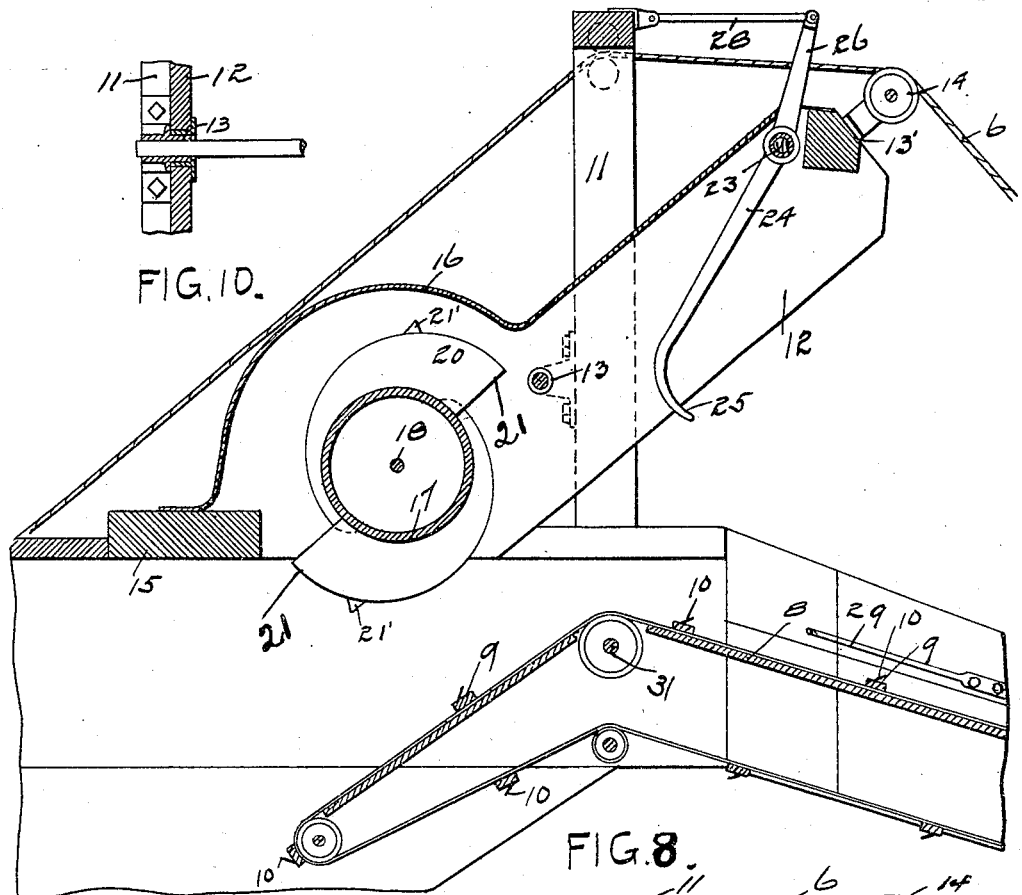
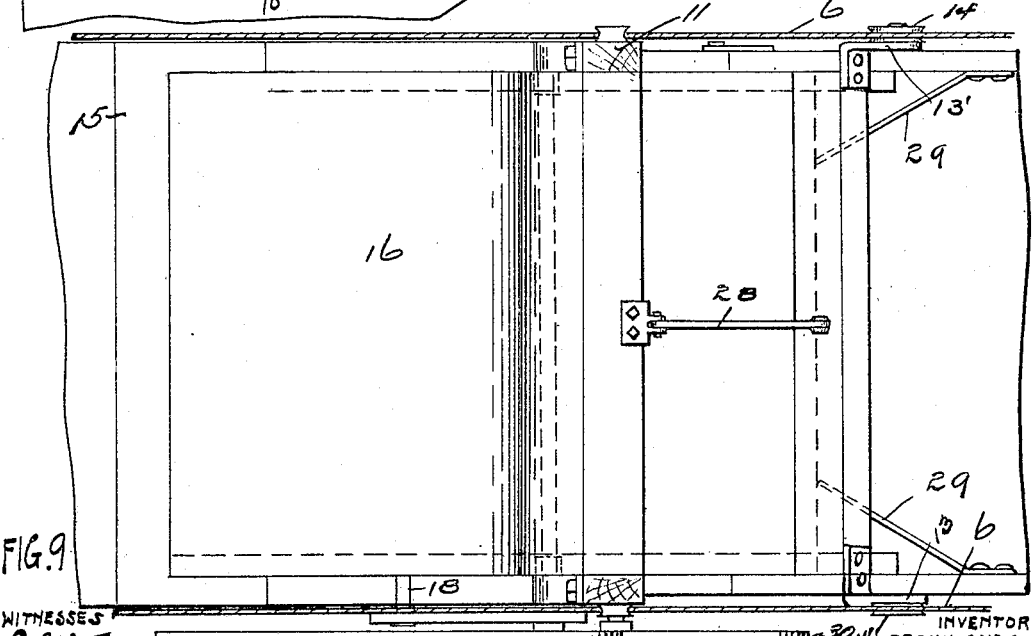

UNITED STATES PATENT OFFICE.

FRANK EVES, OF LA CROSSE, WISCONSIN.

BAND-CUTTER AND FEEDER.

SPECIFICATION forming part of Letters Patent No. 784,313, dated March 7, 1905.

Application filed May 31, 1904. Serial No. 210,427.

*To all whom it may concern:*

Be it known that I, FRANK EVES, a resident of La Crosse, La Crosse county, Wisconsin, have invented certain new and useful Improvements in Band-Cutters and Feeders, of which the following is a specification.

The object of my invention is to provide an apparatus in connection with the band-cutting mechanism of a band-cutter and feeder for spreading or distributing the grain out to the sides of the machine, to the end that the material will pass into the cylinder in a thin uniform sheet and all danger of clogging will be avoided.

A further object is to increase the capacity of the machine and provide for more efficient threshing by separating and spreading the grain when the bundles are cut.

A further object is to provide means for retarding or holding back the grain in case any considerable volume over and above a certain predetermined amount should pass under the band-cutter.

A further object is to provide improved speed-controlling devices.

The invention consists generally in the various constructions and combinations, all as hereinafter described, and particularly pointed out in the claims.

In the accompanying drawings, forming part of this specification, Figure 1 is a side elevation of a band-cutter and feeder embodying my invention. Fig. 2 is a plan view of a portion of the bundle-carrier, the knife-carrying cylinder, and the retarding devices. Fig. 3 is a detail of the feed-pan provided between the band-cutter and the cylinder. Fig. 4 is a perspective view of the band-cutter cylinder. Fig. 5 is a detail of the centrifugal-governor mechanism. Fig. 6 is a vertical section of the same. Fig. 7 is a transverse sectional view of the band-cutter cylinder. Fig. 8 is a vertical longitudinal section of the band-cutter and feeder mechanism. Fig. 9 is a plan view of the same. Fig. 10 is a detail showing the bearing of the band-cutter cylinder in the casing.

In the drawings, 2 represents the separator-casing, and 3 the casing of the band-cutter and feeder, mounted on the separator in any suitable way and carrying at its outer end the bundle-carrier frame composed of sections 4 and 5, hinged together, that are adapted to be folded into the positions indicated by dotted lines in Fig. 1, a rope 6 and windlass mechanism 7 being provided for convenience in manipulating the hinged sections.

8 is the bundle-carrier belt, provided with transverse slats 9, having a series of spikes 10, which engage the bundles and carry them with the belt into the machine.

Upon the frame 3 I provide upright standards 11. A shoe-frame 12 is provided with sleeves 13 at a point midway between the ends of the frame, and these sleeves are journaled on the standards 11 and allow the frame to be oscillated and adjust itself automatically to the volume of grain entering the machine. The outer end of the frame 12 is provided with brackets 13', carrying idle wheels 14, over which the rope 6 passes, and by regulating the tension of this rope the operator can control the position of the oscillating frame. A cross-bar 15 is provided on the inner end of the frame 12 and adapted to strike the sides of the casing 3 and limit the movement of the frame in one direction. A shield or guard 16, preferably of metal, extends from the bar 15 over the upper portion of the oscillating frame to the outer end thereof, and this shield is preferably arched at its inner end to act as a hood or cap for the band-cutting cylinder 17, that is mounted on a shaft 18, having bearings 19 in the sides of the frame 12. This cylinder is provided on its periphery with a series of webs 20, having cutting-beaks 21, secured by any suitable means to the surface of the cylinder and extending spirally thereon from the center toward each end. Each web is arranged to extend around the cylinder a distance equal to about one-half of its circumference, and each web is offset from the preceding one and a little in the rear, so that when the cylinder is revolved the webs will plow into the grain and spread it out to the sides of the machine. The cutting-beaks will successively enter the grain in a manner similar to the action of a gang-plow, and I have found that it is impossible to clog the machine and that it makes no difference whether the grain is wet or dry the webs will separate it and distribute it thoroughly out to the walls of the casing with equal efficiency. The edges of the webs are provided at intervals with cutting teeth or fins 21', which serve to cut the bundle-bands, and between the webs, on the surface of the cylinder, I arrange a series of radiating pins or spines 22. The webs, as shown clearly in Fig. 7, increase in depth from one end toward the other and insure the complete separation and plowing apart of the grain brought up by the bundle-carrier. After leaving the band-cutting cylinder the grain will pass in a thin uniform sheet into the threshing-cylinder. The band-cutter cylinder will rest by gravity upon the grain, rising and falling according to the volume thereof, the oscillating shoe yielding easily to the pressure of the bundles or the loose grain as it enters the machine.

It is desirable in an apparatus of this kind to provide some means for holding back the grain, particularly when it is delivered in a loosened condition, and prevent clogging of the band-cutter and cylinder. I therefore provide a shaft 23 in the outer end of the frame 12 and mount thereon a series of arms 24, having outwardly-curved lower ends 25, that depend into the path of the grain as it is brought up by the carrier-belt. A lever 26 is secured on the shaft 23 and connected with a cross-bar 27 by a link 28. The shaft 23 being movable with the frame 12 and the link 28 having a fixed connection at one end, it follows that movement of the shoe-frame 12 will cause oscillation of the arms 24 and their adjustment in different positions in respect to the band-cutting cylinder. For instance, if a large volume of loose grain is fed into the machine and the inner end of the shoe-frame raised by the pressure thereof the outer end will of course be depressed and the arms 24 will be swung outwardly to engage the grain and hold it back until the band-cutter has had sufficient time to clear itself. As before stated, the normal position of the shoe-frame can be readily controlled by the tension of the rope 6, and at any time the operator by loosening this rope can readjust the frame to suit the threshing conditions. Upon each side of the bundle-carrier belt I prefer to provide a series of rods or fingers 29, that are mounted in the guide-boards on the carrier-frame and extend inwardly over the belt toward the band-cutter cylinder. These fingers engage the bundles of grain and coöperating with the moving belt tend to swing the bundles so that they will be fed endwise into the machine.

A pulley 30 is mounted on the shaft 31 of the carrier-belt and has a driving connection with other operating parts of the mechanism, as indicated in Fig. 1. These driving mechanisms and connections are, however, of ordinary construction and do not require detailed description or illustration herein. A centrifugal-governor mechanism, however, is mounted on the pulley 30, which I will now proceed to describe in detail.

A flat disk 32 is secured on the end of the shaft 31, and the pulley-hub 33 is loosely mounted on said shaft, between which hub and the disk 32 a movable friction-plate 34 is mounted, suitable pins 35 being provided to prevent revolution of the friction-plate on the shaft. Cam-surfaces 36 are provided on the inner face of the friction-plate opposite corresponding surfaces on the pulley 30. Between the hub 33 and the rim of the pulley I provide rods 37, whereon blocks 38 are slidable and normally held toward the center of the pulley by springs 39, whose tension is regulated by adjusting-nuts 40. These springs are arranged to yield when the pulley is revolved and allow the blocks to slide outwardly on their supporting-rods. The inner ends of the blocks are provided with wedge-shaped parts 41, which lie between the cam-surfaces 36, and when the blocks are thrown outwardly by centrifugal force the wedge-shaped portions will engage the cam-surfaces 36 and press the friction-plate against the disk 32, locking the pulley on the shaft and revolving the band-cutting cylinder. It will be noted that this revolution of the band-cutting cylinder will not take place until the pulley 30 is revolved at a certain predetermined speed to operate the clutch mechanism.

In Fig. 3 I have shown a feed-pan 42, operated by a crank mechanism 43 in the usual way, beneath the discharge end of the bundle-carrier and between it and the threshing-cylinder.

I claim as my invention—

1. In a band-cutter and feeder, the combination, with a freely-oscillating centrally-pivoted shoe-frame, of a revolving band-cutting cylinder mounted in said frame near its inner end, a bundle-carrier operating beneath said frame and cylinder, a hinged frame for said carrier, and an operating means for the frame of said bundle-carrier having an antifrictional connection with the outer end of said shoe-frame.

2. In a band-cutter and feeder, the combination, with a centrally-pivoted shoe-frame, of a revolving band-cutting cylinder mounted in said frame, a bundle-carrier operating beneath said cylinder, and a rope connected with the frame of said bundle-carrier and having a sliding connection with the outer end of said shoe-frame, for the purpose specified.

3. In a band-cutter and feeder, the combination, with a pivoted shoe-frame, of a band-cutting cylinder mounted therein on one side of the frame-pivot, a bundle-carrier operating beneath said cylinder, and retarding devices mounted in said frame on the other side of its pivot from said cylinder and adapted to be swung into position by the upward movement of said cylinder to engage and retard the incoming grain.

4. In a band-cutter and feeder, the combination, with a centrally-pivoted shoe-frame, of a band-cutting mechanism mounted therein near one end and a series of retarding-arms carried by the opposite end of said frame, means for adjusting said frame and operative connections provided between said arms, and a fixed support whereby when said cylinder is raised by the pressure of the grain said arms will be tilted to engage and retard the incoming grain.

5. In a band-cutter and feeder, the combination, with a shaft, of a pulley loosely mounted thereon, a disk secured on said shaft, a friction-plate interposed between said disk and the hub of said pulley and having cam-surfaces, and blocks carried by said pulley and arranged to be thrown out by centrifugal force to engage said cam-surfaces and operate said friction-plate, for the purpose specified.

6. In a band-cutter and feeder, the combination, with a shaft, of a pulley loosely mounted thereon, a disk secured on said shaft, a friction-plate having cam-surfaces interposed between said pulley-hub and said disk, rods connecting said hub and said pulley-rim, blocks slidably mounted on said rods and having wedge-shaped inner ends adapted to engage said cam-surfaces and pressure-springs provided on said rods and engaging said blocks.

7. In a band-cutter and feeder, a revolving cylinder provided with a series of webs arranged spirally on the periphery of said cylinder from the center toward the end, each web having a sharpened beak at its forward end and being offset and in the rear of the contiguous web, whereby the grain will be plowed out toward the ends of the cylinder in successive rows.

8. In a band-cutter and feeder, a revolving cylinder having a series of webs extending spirally thereon upon each side of the center, each web extending on the surface of the cylinder a distance equal to about one-half its circumference and having a sharpened beak at the forward end and offset and in the rear of the contiguous web, substantially as described.

In witness whereof I have hereunto set my hand this 25th day of May, 1904.

FRANK EVES.

In presence of—
  RICHARD PAUL,
  M. HAGERTY.